F. H. TERRY & H. M. BIGWOOD.
ELECTRIC CONDUIT JUNCTION BOX.
APPLICATION FILED FEB. 11, 1913.
1,184,273.
Patented May 23, 1916.
Fig. 1.
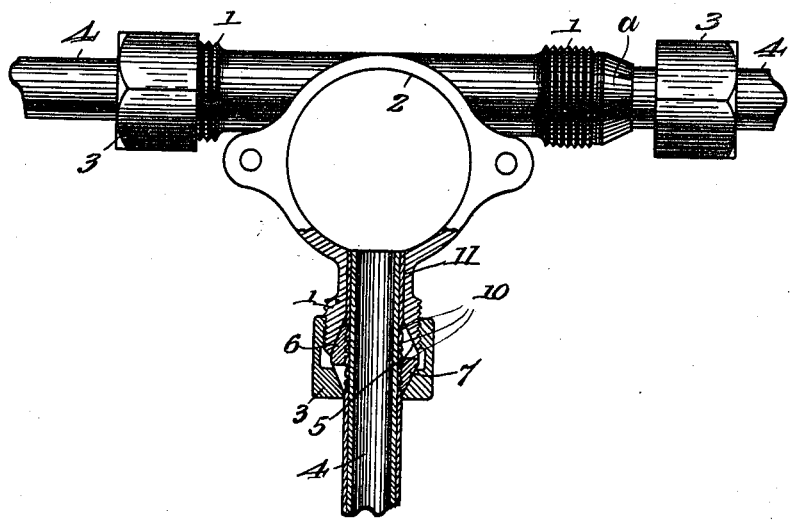
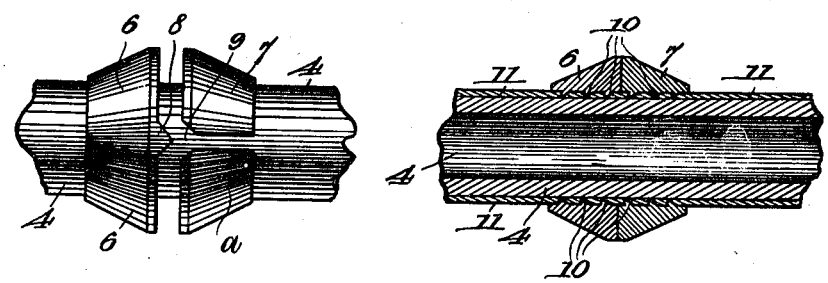
Fig. 2.
Fig. 3.
WITNESSES
Frank H Logan
R W Appleton
INVENTORS
F.H.TERRY AND H.M.BIGWOOD
BY
THEIR ATTORNEY.

UNITED STATES PATENT OFFICE.

FREDERICK HERBERT TERRY AND HENRY MALCOLM BIGWOOD, OF WOLVERHAMPTON, ENGLAND.

ELECTRIC-CONDUIT JUNCTION-BOX.

1,184,273.  Specification of Letters Patent.  Patented May 23, 1916.

Application filed February 11, 1913. Serial No. 747,688.

*To all whom it may concern:*

Be it known that we, FREDERICK HERBERT TERRY and HENRY MALCOLM BIGWOOD, subjects of the King of Great Britain, residing at The Nook, Penn, Wolverhampton, and 23 Albany road, Wolverhampton, in the county of Stafford, England, respectively, have invented a new and useful Electric-Conduit Junction-Box; and we do hereby declare the following to be a full, clear, and exact description of the same.

Our invention comprises improvements in electric conduit junction boxes.

In our prior specification forming a part of United States Patent, Number 1,072,379 we have described a means of securing conduit tubes in position in the boxes comprising a coupling with a contractible member surrounding the tube. Such conduit tubes are usually enameled but it is necessary for the tubes to be electrically connected as well as mechanically connected to the junction boxes, and it is the object of the present invention to provide a means whereby such tubes may be electrically connected to the junction boxes in a simple manner without necessitating the enamel or japan being scraped off the end of the tube, which is a lengthy and objectionable proceeding.

According to our invention the interior of the contractible part of the coupling is provided with a series of projections which are arranged to cut through the enamel and make a metal to metal engagement with the tube and thereby establish electrical connection between the tube and the junction box when the conduit tubes are secured in position in said box. This contractible part in a coupling made according to our invention has a motion as it is contracted also in the longitudinal direction of the tube, and the ridges of annular or spiral teeth or projections have thus a definite scraping action as well as an inward cutting motion.

Referring to the drawings: Figure 1. illustrates a three way conduit junction box according to this invention partly in section. Fig. 2. is an enlarged view showing the exterior of two conical members. Fig. 3. is a longitudinal section of same.

The three way conduit junction box illustrated is according to our aforementioned prior specification; the socket ends 1 of the junction box 2 are externally screwed to receive the cap nut 3 and internally bored to receive the conduit pipes 4. The mouths of the sockets are bored taper as 5 to receive a correspondingly externally tapered split ring 6 while the nut is similarly bored to receive a similar split ring 7; the member 6 being provided with a projection 8 which engages the slot or opening 9 in the other ring to prevent relative rotation.

It will be obvious that when the nut is tightened up the two rings will be gripped between the internally tapered parts of the nut and socket being thus contracted about the pipe with which they will make perfect engagement, for owing to their formation and arrangement the bore of the rings will remain parallel when contracted and grip for their full length; and in accordance with the present invention we provide the interior of the coned members 6 and 7 with projections 10 of any suitable section and arranged in any suitable way, the illustrated form being of a triangular section presenting one projecting surface at right angles to the axis of the pipe, while the second surface is conical.

When the pipes are fixed by screwing up the nut in manner described above, the projections cut through the enamel 11 and make a metal to metal contact with the pipe thereby establishing an electrical connection therewith. The projections 10 extend around the pipe annularly, and owing to their section a very powerful mechanical connection is established between the box and the pipe, making it very difficult or impossible for the pipe to be drawn out in the one direction.

What we claim then is:—

1. In an electrical conduit junction box, the combination of an externally screw threaded socket member having a smooth outwardly flaring interior wall; an enameled pipe disposed in said member; a sleeve nut having at its inner end threaded engagement with said socket and at its outer end a smooth outwardly tapering interior wall; a pair of tapered split rings placed base to base, with their splits in staggered relation, and disposed with their tapered parts in contact with the respective smooth walls of the nut and socket; and sharp annular projections on the interior surfaces of said rings and adapted to be forced simultaneously laterally and longitudinally along the pipe and inwardly into the enamel when the nut is screwed onto the socket.

2. In an electrical conduit junction box, the combination of an externally screw threaded socket member having a smooth outwardly flaring interior wall; an enameled pipe disposed in said member; a sleeve nut having at its inner end threaded engagement with said socket and at its outer end a smooth outwardly tapering interior wall; a pair of tapered split rings placed base to base, with their splits in staggered relation, and disposed with their tapered parts in contact with the respective smooth walls of the nut and socket; and sharp annular projections on the interior surfaces of said rings and adapted to be forced simultaneously spirally along the pipe and inwardly into the enamel when the nut is screwed onto the socket, said projections being sloping on one side and steep on the side toward which they are moved when the nut is tightened upon the socket.

3. In combination, a junction box having a socket; an enameled pipe in said socket; rings surrounding the pipe and provided with sharp annular projections having steep portions on the side toward the junction box; and a nut engaging the socket and rings and adapted when screwed onto the socket to coöperate with the socket and rings to simultaneously positively force the projections to scrape spirally along the enamel and dig into the enamel and to force the rings into contact with the enamel, whereby good electrical contact is made with the pipe.

In testimony whereof, we have signed our names to this specification in the presence of two subscribing witnesses.

F. HERBERT TERRY.
HENRY MALCOLM BIGWOOD.

Witnesses:
HAROLD C. SOWSTER,
NORMAN S. BARLOW.